(12) United States Patent
Yanagisawa

(10) Patent No.: US 8,357,762 B2
(45) Date of Patent: Jan. 22, 2013

(54) ORGANOPOLYSILOXANE AND MAKING METHOD

(75) Inventor: Hideyoshi Yanagisawa, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 273 days.

(21) Appl. No.: 12/841,281

(22) Filed: Jul. 22, 2010

(65) Prior Publication Data

US 2011/0021723 A1    Jan. 27, 2011

(30) Foreign Application Priority Data

Jul. 23, 2009   (JP) .................................. 2009-172006

(51) Int. Cl.
*C08G 77/08*   (2006.01)
*C08G 77/04*   (2006.01)
*C08L 83/04*   (2006.01)

(52) U.S. Cl. ........ 525/474; 525/475; 525/476; 525/477; 525/478; 525/479; 528/10; 528/49

(58) Field of Classification Search .......... 525/474–479; 528/10–43
See application file for complete search history.

(56) References Cited

U.S. PATENT DOCUMENTS

| | | | | |
|---|---|---|---|---|
| 2,758,946 A * | 8/1956 | Shepherd et al. | ............. | 427/387 |
| 3,372,178 A * | 3/1968 | Wu | ................................ | 556/451 |
| 3,385,878 A * | 5/1968 | Wu | ................................ | 556/447 |
| 3,629,310 A * | 12/1971 | Bailey et al. | ................... | 556/444 |
| 5,420,325 A * | 5/1995 | Razzano | ........................ | 556/460 |
| 5,650,474 A | 7/1997 | Yamaya et al. | | |
| 5,670,689 A * | 9/1997 | Allandrieu et al. | ........... | 556/460 |
| 5,932,757 A * | 8/1999 | Standke et al. | ................ | 556/457 |
| 6,841,197 B2 | 1/2005 | Standke et al. | | |
| 7,645,894 B2 * | 1/2010 | Kanner | ........................ | 556/473 |
| 2008/0097064 A1 | 4/2008 | Blanc-Magnard et al. | | |

FOREIGN PATENT DOCUMENTS

JP        2002-226490 A     8/2002
JP           3474007 B2    12/2003

OTHER PUBLICATIONS

Clarson et al., "Cyclic polysiloxanes: 1. Preparation and characterization of poly(phenylmethylsiloxane)," Poylmer, Oct. 1986, vol. 27, pp. 1633-1636.

Dodgson et al., "Studies of cyclic and linear poly(dimetheyl siloxanes): 2. Preparative gel permeation chromatography," Polymer, Nov. 1978, vol. 19, pp. 1285-1289.

European Search Report issued Sep. 21, 2010, in connection with European Patent Application No. 10251307.4.

* cited by examiner

*Primary Examiner* — Randy Gulakowski
*Assistant Examiner* — Mike M Dollinger
(74) *Attorney, Agent, or Firm* — Birch Stewart Kolasch & Birch, LLP

(57) ABSTRACT

An organopolysiloxane is prepared by hydrolysis and polycondensation of an organosilicon compound in the presence of a liquid hydrolytic condensation catalyst which is separable. The organopolysiloxane contains a high proportion of cyclic polysiloxanes and has a sharp molecular weight distribution due to minimized monomer and polymer contents.

4 Claims, 2 Drawing Sheets

ORGANOPOLYSILOXANE AND MAKING METHOD

CROSS-REFERENCE TO RELATED APPLICATION

This non-provisional application claims priority under 35 U.S.C. §119(a) on Patent Application No. 2009-172006 filed in Japan on Jul. 23, 2009, the entire contents of which are hereby incorporated by reference.

TECHNICAL FIELD

This invention relates to an organopolysiloxane mixture containing a high proportion of cyclic polysiloxanes and having a sharp molecular weight distribution due to minimized contents of monomers and polymers, and a method for preparing the same.

BACKGROUND ART

As is well known in the art, organopolysiloxanes are generally prepared by hydrolysis and polycondensation of organochlorosilanes or organoalkoxysilanes in the presence of various catalysts. For example, JP-A 2002-226490 describes the synthesis of n-propylethoxysiloxane by subjecting n-propyltriethoxysilane to reaction in ethanol and water in the presence of hydrogen chloride catalyst under reflux conditions. JP 3474007 discloses the synthesis of a polysiloxane by hydrolysis and polycondensation of an alkoxysilane having an organic functional radical in the presence of a neutral fluorinated compound. Many other hydrolytic condensation catalysts have been proposed thus far including acids, bases and metal compounds. The methods using these known catalysts are directed to the production of not only oligomers, but also polymers, despite some monomers left unreacted, rather than selective hydrolysis and polycondensation of monomers into oligomers. Accordingly, there is a need for a method of preparing polysiloxanes with minimized contents of monomers and polymers.

Citation List
Patent Document 1: JP-A 2002-226490 (EP 1205481 A2, US 20020090316)
Patent Document 2: JP 3474007

SUMMARY OF INVENTION

An object of the invention is to provide an organopolysiloxane mixture containing the majority of cyclic polysiloxanes and having minimized contents of monomers and polymers, and a method for preparing the same.

The inventor has found that when an organopolysiloxane mixture is prepared by effecting hydrolysis and polycondensation of an organosilicon material comprising an organosilicon compound and/or a partial hydrolytic condensate thereof, the use of a liquid hydrolytic condensation catalyst which is separable from the resulting organopolysiloxanes ensures to produce an organopolysiloxane mixture having a high proportion of cyclic siloxanes and a sharp molecular weight distribution. This is because the liquid catalyst allows for selective hydrolysis of low-molecular-weight compounds or monomers which readily dissolve in the liquid catalyst, and the resulting organopolysiloxanes which difficulty dissolve in the liquid catalyst are unsusceptible to further hydrolysis into polymers.

In one aspect, the invention provides an organopolysiloxane mixture comprising cyclic organopolysiloxanes and linear organopolysiloxanes, obtained by hydrolysis and polycondensation of an organosilicon material comprising a first organosilicon compound and/or a partial hydrolytic condensate thereof and optionally, a second organosilicon compound and/or a partial hydrolytic condensate thereof. The first organosilicon compound has the general formula (1):

$$XSi(OR^1)_3 \tag{1}$$

wherein X is a $C_1$-$C_{18}$ monovalent hydrocarbon radical which may have at least one functional radical selected from the group consisting of mercapto, epoxy, (meth)acryloxy, alkenyl, amino, and halogen, and $R^1$ is a $C_1$-$C_4$ monovalent hydrocarbon radical. The second organosilicon compound has the general formula (2):

$$Y_rR^2_sSi(OR^1)_{(4-r-s)} \tag{2}$$

wherein Y is a $C_1$-$C_{18}$ monovalent hydrocarbon radical which may have at least one functional radical selected from the group consisting of mercapto, epoxy, (meth)acryloxy, alkenyl, amino, and halogen, $R^2$ is a $C_1$-$C_3$ monovalent hydrocarbon radical different from Y, $R^1$ is a $C_1$-$C_4$ monovalent hydrocarbon radical, r is 0, 1 or 2, s is 0 or 1, and r+s is 0, 1, 2 or 3, with the proviso that Y is different from X in formula (1) when r is 1 and s is 0. The organopolysiloxane mixture has a polydispersity index (Mw/Mn) of no more than 1.2, given as a weight average molecular weight (Mw) divided by a number average molecular weight (Mn) as measured by GPC versus polystyrene standards. When analyzed by silicon NMR spectroscopy, the organopolysiloxane mixture exhibits a peak component (T2) assigned to siloxane units formed by hydrolytic condensation between two alkoxy radicals on the first organosilicon compound and/or partial hydrolytic condensate thereof, the peak component (T2) including a peak component (T2a) assigned to the cyclic constituent and a peak component (T2b) assigned to the linear constituent in a ratio (T2a/T2b) of at least 0.9, preferably at least 2.0.

In another aspect, the invention provides a method for preparing the organopolysiloxane mixture of claim 1 comprising subjecting an organosilicon material comprising a first organosilicon compound of formula (1) defined above and/or a partial hydrolytic condensate thereof and optionally, a second organosilicon compound of formula (2) defined above and/or a partial hydrolytic condensate thereof to hydrolysis and polycondensation in the presence of a liquid hydrolytic condensation catalyst which is separable from the resulting organopolysiloxanes.

The hydrolytic condensation catalyst is typically urea hydrochloride, and more preferably urea hydrochloride in alcohol solution.

ADVANTAGEOUS EFFECTS OF INVENTION

The organopolysiloxane mixture of the invention contains a high proportion of cyclic polysiloxanes and has a sharp molecular weight distribution due to minimized contents of monomers and polymers.

DESCRIPTION OF EMBODIMENTS

Figure 1:
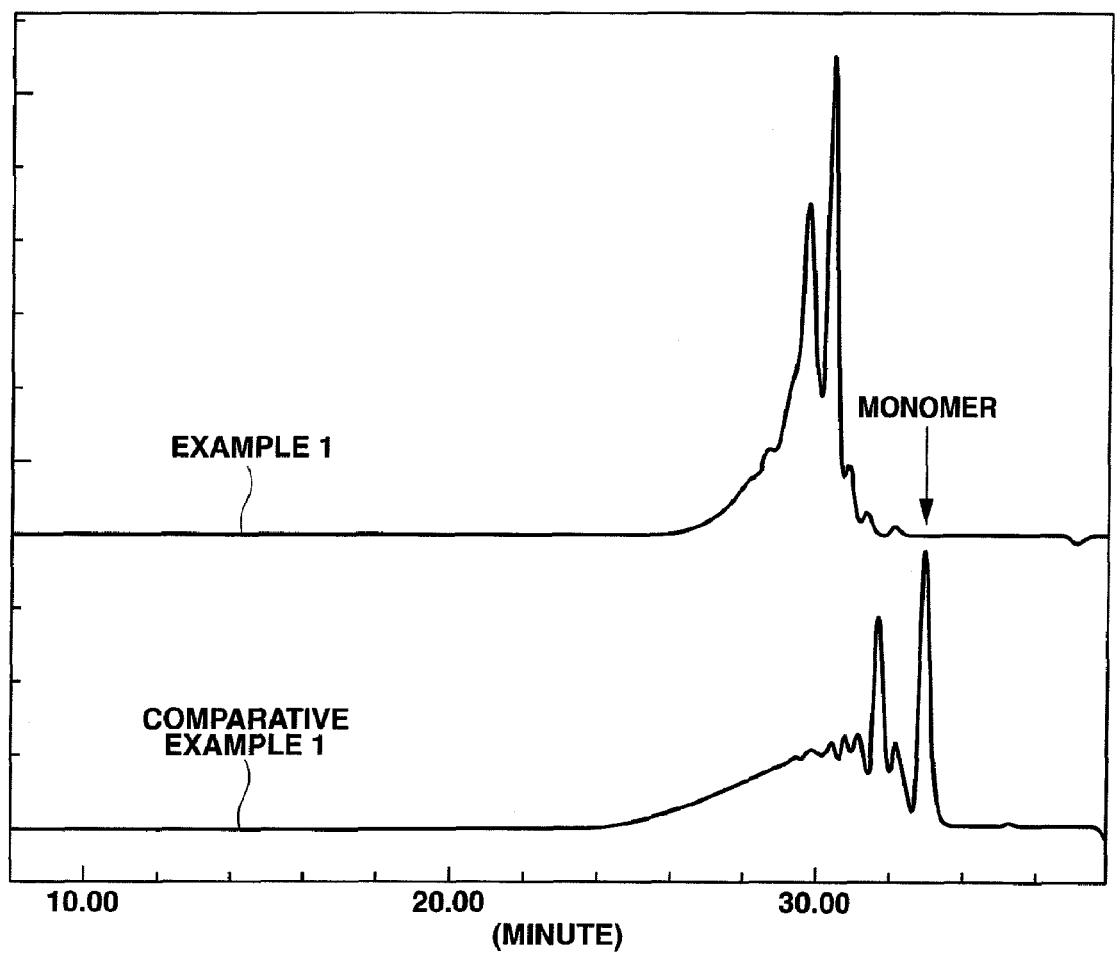
FIG. 1 is a diagram showing the GPC analysis results of the reaction products in Example 1 and Comparative Example 1.

The singular forms "a," "an" and "the" include plural referents unless the context clearly dictates otherwise. As used herein, "optional" or "optionally" means that the subsequently described event or circumstances may or may not occur, and that description includes instances where the event or circumstance occurs and instances where it does not. Further as used herein, the terms "first," "second," and the like do not denote any order or importance, but rather are used to distinguish one element from another.

The notation ($C_n$—$C_m$) means a radical containing from n to m carbon atoms per radical.

The abbreviation GPC stands for gel permeation chromatography, and NMR stands for nuclear magnetic resonance spectroscopy.

The organopolysiloxane mixture of the invention is prepared by hydrolysis and polycondensation of an organosilicon material in the presence of a liquid hydrolytic condensation catalyst which is separable from the resulting organopolysiloxanes. The organosilicon material comprises a first organosilicon compound having the general formula (1) and/or a partial hydrolytic condensate thereof and optionally a second organosilicon compound having the general formula (2) and/or a partial hydrolytic condensate thereof.

$$XSi(OR^1)_3 \quad (1)$$

$$Y_r R^2_s Si(OR^1)_{(4-r-s)} \quad (2)$$

In formula (1), X is a monovalent hydrocarbon radical of 1 to 18 carbon atoms, specifically 1 to 14 carbon atoms which may have at least one functional radical selected from mercapto, epoxy, (meth)acryloxy, alkenyl, amino, and halogen. X is preferably alkyl, alkenyl, aryl, aralkyl, or substituted forms of these monovalent hydrocarbon radicals in which one or more hydrogen atoms are substituted by the foregoing functional radicals, examples of which include methyl, ethyl, propyl, butyl, hexyl, octyl, decyl, octadecyl, vinyl, aminopropyl, aminoethylaminopropyl, glycidoxypropyl, epoxycyclohexylethyl, methacryloxypropyl, acryloxypropyl, chloropropyl, mercaptopropyl, ureidopropyl, isocyanatopropyl, phenyl, aminophenyl, styryl, trifluoropropyl, perfluorohexyl, perfluorooctyl, and perfluorodecyl. $R^1$ is a $C_1$-$C_4$ monovalent hydrocarbon radical, such as methyl, ethyl, propyl or butyl.

Examples of the first organosilicon compound of formula (1) include methyltrimethoxysilane, methyltriethoxysilane, methyltributoxysilane, ethyltrimethoxysilane, propyltrimethoxysilane, propyltriethoxysilane, propyltripropoxysilane, butyltrimethoxysilane, butyltriethoxysilane, hexyltrimethoxysilane, hexyltriethoxysilane, octyltrimethoxysilane, octyltriethoxysilane, decyltrimethoxysilane, octadecyltrimethoxysilane, phenyltrimethoxysilane, phenyltriethoxysilane, phenyltripropoxysilane, phenyltributoxysilane, aminopropyltriethoxysilane, aminopropyltrimethoxysilane, aminoethylaminopropyltrimethoxysilane, vinyltrimethoxysilane, vinyltriethoxysilane, epoxyhexylethyltrimethoxysilane, glycidoxypropyltrimethoxysilane, glycidoxypropyltriethoxysilane, methacryloxypropyltrimethoxysilane, methacryloxypropyltriethoxysilane, acryloxypropyltrimethoxysilane, mercaptopropyltrimethoxysilane, mercaptopropyltriethoxysilane, ureidopropyltriethoxysilane, ureidopropyltrimethoxysilane, isocyanatopropyltriethoxysilane, isocyanatopropyltrimethoxysilane, styryltrimethoxysilane, and styryltriethoxysilane.

In formula (2), Y is a $C_1$-$C_{18}$ monovalent hydrocarbon radical which may have at least one functional radical selected from mercapto, epoxy, (meth)acryloxy, alkenyl, amino, and halogen. Y is preferably alkyl, alkenyl, aryl, aralkyl, or substituted forms of these monovalent hydrocarbon radicals in which one or more hydrogen atoms are substituted by the foregoing functional radicals, examples of which include methyl, ethyl, propyl, butyl, hexyl, octyl, decyl, octadecyl, vinyl, aminopropyl, aminoethylaminopropyl, glycidoxypropyl, epoxycyclohexylethyl, methacryloxypropyl, acryloxypropyl, chloropropyl, mercaptopropyl, ureidopropyl, isocyanatopropyl, phenyl, aminophenyl, styryl, trifluoropropyl, perfluorohexyl, perfluorooctyl, and perfluorodecyl. Y is a radical different from X in formula (1) when r is 1 and s is 0. $R^2$ is a $C_1$-$C_3$ monovalent hydrocarbon radical different from Y, for example, methyl, ethyl or propyl. $R^1$ is a $C_1$-$C_4$ monovalent hydrocarbon radical, for example, methyl, ethyl, propyl or butyl. The letter r is 0, 1 or 2, s is 0 or 1, and r+s is 0, 1, 2 or 3, preferably 0, 1 or 2.

Examples of the second organosilicon compound of formula (2) include methyltrimethoxysilane, methyltriethoxysilane, methyltributoxysilane, dimethyldimethoxysilane, dimethyldiethoxysilane, ethyltrimethoxysilane, propyltrimethoxysilane, propyltriethoxysilane, propyltripropoxysilane, propylmethyldimethoxysilane, propylmethyldiethoxysilane, butyltrimethoxysilane, butyltriethoxysilane, hexyltrimethoxysilane, hexyltriethoxysilane, hexylmethyldimethoxysilane, octyltrimethoxysilane, octyltriethoxysilane, octylmethyldimethoxysilane, decyltrimethoxysilane, phenyltrimethoxysilane, phenyltriethoxysilane, phenyltripropoxysilane, phenyltributoxysilane, diphenyldimethoxysilane, aminopropyltriethoxysilane, aminopropyltrimethoxysilane, aminoethylaminopropyltrimethoxysilane, vinyltrimethoxysilane, vinyltriethoxysilane, vinylmethyldimethoxysilane, epoxyhexylethyltrimethoxysilane, glycidoxypropyltrimethoxysilane, glycidoxypropyltriethoxysilane, methacryloxypropyltrimethoxysilane, methacryloxypropyltriethoxysilane, methacryloxypropylmethyldimethoxysilane, methacryloxypropylmethyldiethoxysilane, acryloxypropyltrimethoxysilane, mercaptopropyltrimethoxysilane, mercaptopropyltriethoxysilane, mercaptopropylmethyldimethoxysilane, ureidopropyltriethoxysilane, ureidopropyltrimethoxysilane, isocyanatopropyltriethoxysilane, isocyanatopropyltrimethoxysilane, styryltrimethoxysilane, styryltriethoxysilane, tetramethoxysilane, tetraethoxysilane, tetrapropoxysilane, and tetrabutoxysilane. A mixture of such organosilicon compounds of formula (2) may also be used.

According to the invention, an organosilicon compound material which comprises a first organosilicon compound of formula (1) and/or a partial hydrolytic condensate thereof and an optional second organosilicon compound of formula (2) (different from formula (1)) and/or a partial hydrolytic condensate thereof is subjected to hydrolysis and polycondensation. Any alkoxysilyl-containing organosilicon compound may be added to the organosilicon compound material when hydrolysis and polycondensation reaction is carried out. Examples of the additional organosilicon compound include alkoxysilanes such as trimethylmethoxysilane, trimethylethoxysilane, triethylmethoxysilane and triethylethoxysilane, and alkoxysilyl-containing polysiloxanes.

In the hydrolysis and polycondensation reaction, organosilicon compounds and/or partial hydrolytic condensates thereof may be used in any desired molar ratio. The first organosilicon compound of formula (1) may be used alone, or in combination with the second organosilicon compound of formula (2) for imparting some desired properties. The additional organosilicon compound and/or partial hydrolytic condensate thereof may be added for imparting other properties. Specifically, the first organosilicon compound, the second organosilicon compound, and the additional organosilicon compound may be combined in an approximate molar ratio of (0.01-1.0):(0-1.0): (0-1.0). Particularly when the second organosilicon compound is used in combination, the amount of the second organosilicon compound used is preferably 0.01 to 1.0 mole and more preferably 0.1 to 1.0 mole per mole of the first organosilicon compound.

According to the invention, organopolysiloxanes are prepared using a liquid hydrolytic condensation catalyst which is separable from the organopolysiloxane product. The hydrolytic condensation catalyst is not particularly limited as long as it is liquid and separable from the organopolysiloxane product. The preferred catalyst is urea hydrochloride, a salt of urea with hydrochloric acid and more preferably urea hydrochloride in alcohol solution. Examples of the alcohol used herein include, but are not limited to, methanol, ethanol, propanol, and butanol.

The amount of the hydrolytic condensation catalyst used is not particularly limited. The catalyst may be used in a catalytic amount, preferably of at least 0.001 mole, more preferably 0.01 to 20 moles, and most preferably 0.1 to 5 moles per mole of the first organosilicon compound or per mole of the first and second organosilicon compounds combined. With too small amounts of the catalyst, a longer time may be taken for hydrolytic condensation and more monomer(s) may be left unreacted. Too much amounts of the catalyst may be incompletely separable from the organopolysiloxane product and uneconomical.

The amount of the alcohol added is also not particularly limited. The alcohol may preferably be used in an amount of about 1 to about 99% and more preferably about 10 to about 60% by weight based on the total weight of the catalyst and the alcohol.

The method for producing urea hydrochloride as the preferred catalyst is not particularly limited. For example, by dispersing urea in an alcohol and adding concentrated hydrochloric acid or hydrogen chloride in water to the dispersion, there is obtained a hydrous alcohol solution of urea hydrochloride which is ready for use as the catalyst. Alternatively, an alcohol is added into a dispersion of a halogeno-silane and urea to subject the halogenosilane to alkoxylate and the reaction product containing urea hydrochloride per se is used as the catalyst. In this case, the formed urea hydrochloride may be separated from the reaction product to use as the catalyst.

The organopolysiloxane mixture prepared by the inventive method has an average degree of polymerization which depends on the amount of water used for hydrolysis and polycondensation. When the organosilicon material used consists of monomers having one silicon atom, an organopolysiloxane mixture having an average degree of polymerization Z may be prepared by partial hydrolysis and polycondensation using Z moles of the alkoxysilane material and (Z−1) moles of water. Theoretically, cyclic organopolysiloxanes can be prepared by partial hydrolysis and polycondensation using Z moles of the alkoxysilane material and Z moles of water.

If an excess of water is used for hydrolysis, alkoxy radicals may be accordingly hydrolyzed, resulting in a resinous product having more branched structures instead of the desired organopolysiloxanes. The amount of water is preferably no more than 1.5 moles, more preferably 0.1 to 1.5 moles, and most preferably 0.2 to 1.2 moles per mole of the alkoxysilane material.

The mode of adding water for hydrolysis reaction is not particularly limited. For example, hydrolysis reaction may be effected by adding water to the organosilicon compound material in the presence of an anhydrous hydrolytic condensation catalyst. Water may be diluted with a solvent such as alcohol prior to the addition.

When the hydrolytic condensation catalyst is prepared by mixing urea and concentrated hydrochloric acid or hydrogen chloride in water as mentioned above, hydrolysis reaction may be effected by adding this hydrous hydrolytic condensation catalyst to the organosilicon compound material.

Hydrolysis and polycondensation reaction may also be effected by adding the organosilicon compound and/or partial hydrolytic condensate thereof to the hydrous hydrolytic condensation catalyst as prepared.

Organic solvents such as alcohols, ethers, esters, ketones, aliphatic hydrocarbons and aromatic hydrocarbons may be used in hydrolysis and polycondensation reaction, if desired. Examples of the solvent include alcohols such as methanol, ethanol, n-propyl alcohol, isopropyl alcohol and propylene glycol monomethyl ether, ethers such as diethyl ether and dipropyl ether, esters such as methyl acetate, ethyl acetate and ethyl acetoacetate, ketones such as acetone, methyl ethyl ketone and methyl isobutyl ketone, aliphatic hydrocarbons such as hexane, heptane and decane, and aromatic hydrocarbons such as toluene and xylene. Even in the system where the solvent is used, the hydrolytic condensation catalyst must be kept separated from the polysiloxanes resulting from the organosilicon compound and/or partial hydrolytic condensates thereof. In this regard, preference is given to aliphatic hydrocarbons such as hexane, heptane and decane, and aromatic hydrocarbons such as toluene and xylene, which do not interfere with such separation.

Hydrolysis and polycondensation reaction may be performed at a temperature in the range between −10° C. and 150° C. Generally at a temperature below 0° C., reaction may proceed at a slow rate which is practically unacceptable. Too high temperatures may cause gel formation or adversely affect the organic functionalities. The temperature is thus preferably in a range of 0 to 130° C. and more preferably 10 to 100° C.

At the end of reaction, the catalyst used may be separated from the polysiloxane product and removed. The catalyst may be separated after the product is purified, for example, by distilling off the alcohol formed during hydrolysis, the solvent, if used, low-boiling fraction or the like.

In the hydrolysis and polycondensation reaction according to the invention, it is critical that the hydrolytic condensation catalyst is kept separated from the resulting polysiloxanes. The separated state ensures preferential hydrolysis of monomers or low-molecular-weight compounds which readily dissolve in the catalyst solution. An organopolysiloxane mixture of cyclic and linear organopolysiloxanes can thus be produced while the content of monomers or low-molecular-weight compounds and the amount of polymers formed are reduced.

The inventive method is successful in preparing an organopolysiloxane mixture having a high proportion of cyclic polysiloxanes, a minimized polymer content, and a sharp molecular weight distribution. Specifically, the organopolysiloxane mixture preferably has a degree of polymerization of 3 to 20, more preferably 3 to 10, and most preferably 4 to 7. It preferably has a weight average molecular weight (Mw) of 300 to 3,000, more preferably 500 to 2,000, and most preferably 700 to 1,000 as measured by GPC versus polystyrene standards. The polydispersity index (Mw/Mn), given as weight average molecular weight (Mw) divided by number average molecular weight (Mn), is no more than 1.2. The polydispersity index Mw/Mn represents a molecular weight distribution. When analyzed by silicon NMR spectroscopy, the organopolysiloxane mixture exhibits a peak component (T2) assigned to siloxane units formed by hydrolytic condensation between two alkoxy radicals on the first organosilicon compound and/or partial hydrolytic condensate thereof. The peak component (T2) includes a peak component (T2a) assigned to the cyclic constituent and a peak component (T2b) assigned to the linear constituent in a ratio (T2a/T2b) of at least 0.9.

Note that peak components T2, T2a and T2b correspond to the structures depicted below.

Peak component T2 consisting of Si peaks of the structure:

Peak component T2a consisting of Si peaks of the cyclic structure:

Peak component T2b consisting of Si peaks of the linear structure:

Herein X is as defined above, A is silicon, B is hydrogen or $R^1$ as defined above, and n and m each are an integer of at least 3.

In an embodiment wherein the first and second organosilicon compounds of formulae (1) and (2) are subjected to co-hydrolytic condensation, the resulting mixture contains cyclic organopolysiloxanes having siloxane units derived from formula (1) and siloxane units derived from formula (2) and linear organopolysiloxanes having siloxane units derived from formula (1) and siloxane units derived from formula (2). Also in this embodiment, the ratio (T2a/T2b) is preferably at least 0.9.

EXAMPLE

Examples of the invention are given below by way of illustration and not by way of limitation. The organopolysiloxane mixtures obtained in Examples were analyzed by the following methods.

(1) Polydispersity index

Weight average molecular weight (Mw) and number average molecular weight (Mn) of organopolysiloxane are determined by GPC, based on the calibration curve previously depicted using polystyrene standards. A polydispersity index (Mw/Mn) is calculated from these average molecular weights.

(2) NMR

Figure 2:
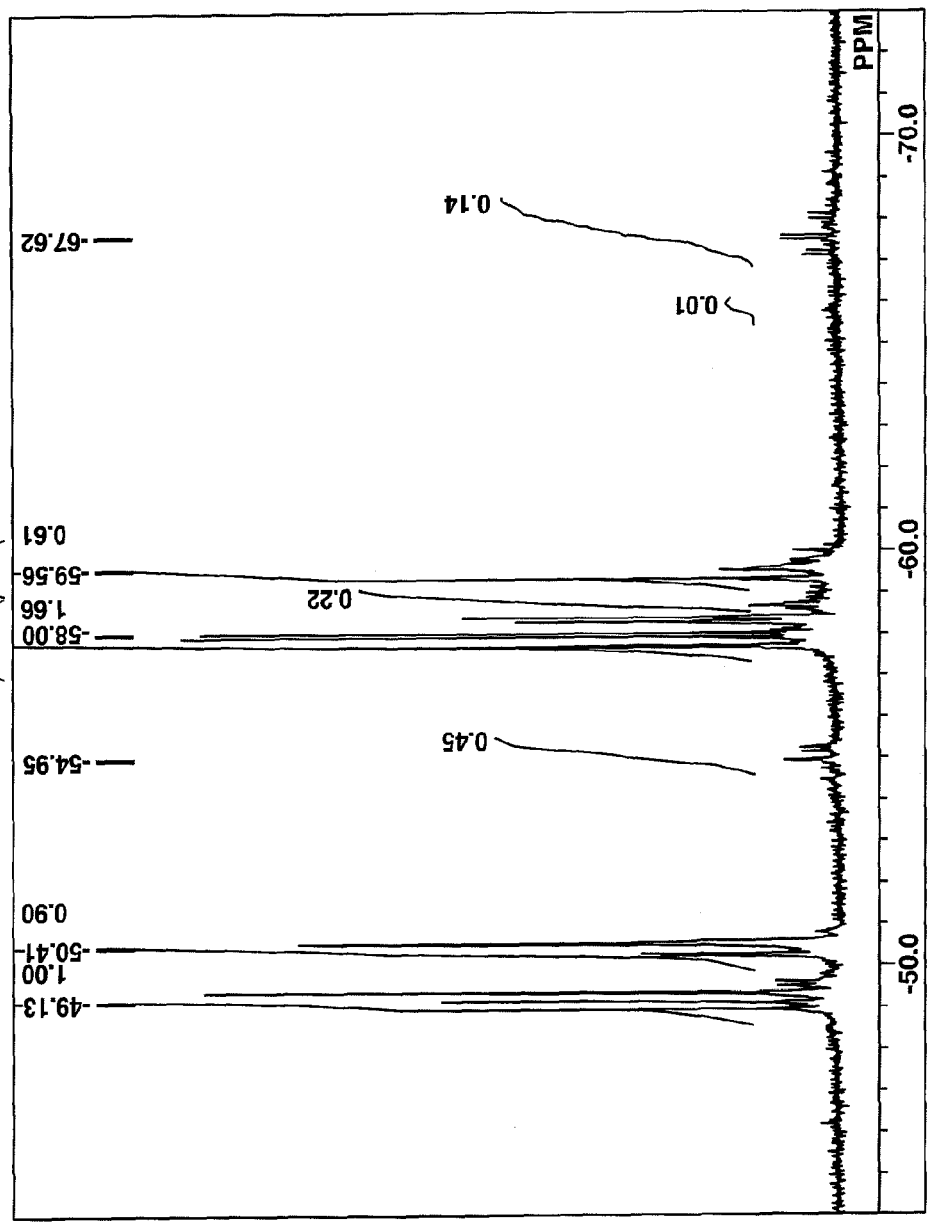
FIG. 2 is a diagram showing the silicon NMR spectrum of the reaction product in Example 3.

Reference may be made to FIG. 2. When analyzed by silicon NMR spectroscopy, the organopolysiloxane mixture exhibits a peak component (T2) assigned to siloxane units formed by hydrolytic condensation between two alkoxy radicals. This peak component (T2) includes peaks in the range of −55 ppm to −61 ppm, when the functional radical (X in formula (1)) is alkyl, for example. The peak component (T2a) assigned to the cyclic constituent includes those peaks in the front part of the peak component (T2) and is an integral value of peaks in the range of −55 to −59 ppm when the functional radical is alkyl, for example. The peak component (T2b) assigned to the linear constituent includes those peaks in the aft part of the peak component (T2) and is an integral value of peaks in the range of −59 to −61 ppm when the functional radical is alkyl, for example. Although the peak range of component T2 varies with the identity of functional radical, the expert can determine the position of component T2 and the assignment of component T2a to the front part thereof from the overall peak profile.

(3) The viscosity is measured at 25° C. by a Cannon-Fenske viscometer. The specific gravity and refractive index are measured at 25° C.

Synthesis Example 1

Preparation of Catalyst

A 300-mL flask equipped with a stirrer, condenser, thermometer and dropping funnel was charged with 60 g (1.875 mol) of methanol and 66 g (1.1 mol) of urea. To the flask at an internal temperature of 22° C., 100 g of concentrated hydrochloric acid (HCl 35 wt %) was slowly added dropwise. Due to exotherm, the solution warmed to 35° C. After the addition, stirring was continued. The temperature dropped to 25° C. over 30 minutes, whereupon stirring was stopped. There was obtained urea hydrochloride in hydrous methanol solution.

Example 1

A 1-L flask equipped with a stirrer, condenser, thermometer and dropping funnel was charged with 198 g (1.0 mol) of phenyltrimethoxysilane. To the flask at 65° C., 62.6 g (water 1.0 mol) of urea hydrochloride in hydrous methanol solution in Synthesis Example 1 was slowly added dropwise over 30 minutes. After the addition, stirring was continued for 3 hours at 70 to 65° C. When stirring was stopped, the polysiloxane product and the urea hydrochloride catalyst layer were kept separated. The reaction mixture was then cooled. With 200 g of toluene added, the mixture was allowed to stand for a while whereupon the lower layer, catalyst layer was separated. The upper layer was concentrated at 90° C. under a vacuum of 0.7 kPa and purified by filtration, obtaining 145 g of a polysiloxane product. Yield: 95.3%.

The product had a viscosity of 338 mm²/s, a specific gravity of 1.213, and a refractive index of 1.5354. The product had a Mw of 658 and a polydispersity index Mw/Mn of 1.10 as measured by GPC. FIG. 1 shows a GPC chart of the product, indicating the presence of the monomer, phenyltrimethoxysilane in an amount of less than 1% and the absence of polymers. On silicon NMR spectroscopy, the ratio (T2a/T2b) of peak component (T2a) representative of cyclic constituent to peak component (T2b) representative of linear constituent was 2.65.

Example 2

A 1-L flask equipped with a stirrer, condenser, thermometer and dropping funnel was charged with 211.5 g (1.0 mol) of phenyltrichlorosilane. To the flask at 65° C., 62 g (2.0 mol) of methanol was added dropwise, during which dehydrochlorination reaction occurred. Then 66 g (1.1 mol) of urea was added and stirring was continued. Further, 38.4 g (1.2 mol) of methanol was slowly added dropwise at 65° C. After the addition, stirring was continued for 2 hours at 65° C. It was found that whenever stirring was stopped, phenyltrimethoxysilane formed by methoxylation and the urea hydrochloride formed by reaction with the hydrogen chloride generated were kept separated in the flask. The reaction solution was stirred again whereupon 18 g (1 mol) of water was slowly added dropwise at 65° C. over 15 minutes. After the addition, stirring was continued for 3 hours at 65° C. The reaction mixture was then cooled. With 200 g of toluene added, the mixture was allowed to stand for a while whereupon the lower layer, catalyst layer was separated. The upper layer was concentrated at 90° C. under a vacuum of 0.7 kPa and purified by filtration, obtaining 141 g of a polysiloxane product. Yield: 92.8%.

The product had a viscosity of 343 mm$^2$/s, a specific gravity of 1.216, and a refractive index of 1.5368. The product had a Mw of 678 and a polydispersity index Mw/Mn of 1.10 as measured by GPC. The analysis also demonstrated the presence of the monomer, phenyltrimethoxysilane in an amount of less than 1% and the absence of polymers. On silicon NMR spectroscopy, the ratio (T2a/T2b) of peak component (T2a) representative of cyclic constituent to peak component (T2b) representative of linear constituent was 2.03.

Example 3

The same procedure as in Example 1 was followed except that 206 g (1.0 mol) of n-hexyltrimethoxysilane was used instead of phenyltrimethoxysilane in Example 1 and the amount of the catalyst in Synthesis Example 1 was changed to 56.3 g (water 0.9 mol). There was obtained 158 g of n-hexyl-functional polysiloxane. Yield: 96.0%.

The product had a viscosity of 9.36 mm$^2$/s, a specific gravity of 0.973 and a refractive index of 1.4303. The product had a Mw of 863 and a polydispersity index Mw/Mn of 1.09 as measured by GPC. The analysis also demonstrated the presence of the monomer, n-hexyltrimethoxysilane in an amount of less than 1% and the absence of polymers. FIG. 2 shows the silicon NMR spectrum of the product. The ratio (T2a/T2b) of peak component (T2a) representative of cyclic constituent to peak component (T2b) representative of linear constituent was 2.00.

Example 4

The same procedure as in Example 1 was followed except that 262 g (1.0 mol) of n-decyltrimethoxysilane was used instead of phenyltrimethoxysilane in Example 1. There was obtained 205 g of n-decyl-functional polysiloxane. Yield: 94.9%.

The product had a viscosity of 33.8 mm$^2$/s, a specific gravity of 0.942 and a refractive index of 1.4444. The product had a Mw of 1,405 and a polydispersity index Mw/Mn of 1.14 as measured by GPC. The analysis also demonstrated the presence of the monomer, n-decyltrimethoxysilane in an amount of less than 1% and the absence of polymers. On silicon NMR spectroscopy, the ratio (T2a/T2b) of peak component (T2a) representative of cyclic constituent to peak component (T2b) representative of linear constituent was 1.10.

Example 5

The same procedure as in Example 2 was followed except that 177.5 g (1.0 mol) of n-propyltrichlorosilane was used instead of phenyltrichlorosilane in Example 2. There was obtained 110 g of n-propyl-functional polysiloxane. Yield: 87.5%.

The product had a Mw of 537 and a polydispersity index Mw/Mn of 1.07 as measured by GPC. The analysis also demonstrated the presence of the monomer, n-propyltrimethoxy-silane in an amount of less than 1% and the absence of polymers. On silicon NMR spectroscopy, the ratio (T2a/T2b) of peak component (T2a) representative of cyclic constituent to peak component (T2b) representative of linear constituent was 3.35.

Example 6

As in Example 2, a flask was charged with 137.5 g (0.65 mol) of phenyltrichlorosilane, to which 41.6 g (1.3 mol) of methanol was added dropwise at 65° C. for dehydrochlorination. Then 43.0 g (0.72 mol) of urea was added and stirring was continued. Further, 25.0 g (0.78 mol) of methanol was slowly added dropwise at 65° C. After the addition, stirring was continued for 2 hours at 65° C. It was found that whenever stirring was stopped, phenyltrimethoxysilane formed by methoxylation and the urea hydrochloride resulting from the hydrogen chloride generated were kept separated. To the reaction solution was added 42.0 g (0.35 mol) of dimethyldimethoxysilane. With stirring resumed, 15 g (0.83 mol) of water was slowly added dropwise at 65° C. over 15 minutes. After the addition, stirring was continued for 3 hours at 65° C. The reaction mixture was then cooled. With 200 g of toluene added, the mixture was allowed to stand for a while whereupon the lower layer, catalyst layer was separated. The upper layer was concentrated at 90° C. under a vacuum of 0.7 kPa and purified by filtration, obtaining 120 g of a polysiloxane product.

The product had a polydispersity index Mw/Mn of 1.04 as measured by GPC. The analysis also demonstrated the presence of the monomer, phenyltrimethoxysilane in an amount of less than 1% and the absence of polymers. On silicon NMR spectroscopy, the ratio (T2a/T2b) of peak component (T2a) representative of cyclic constituent to peak component (T2b) representative of linear constituent was 2.20.

Comparative Example 1

A 1-L flask equipped with a stirrer, condenser, thermometer and dropping funnel was charged with 211.5 g (1.0 mol) of phenyltrichlorosilane. To the flask at 65° C., 62 g (2.0 mol) of methanol and 15 g of water were added dropwise during which dehydrochlorination and hydrolytic condensation reactions occurred (i.e., hydrolytic condensation in the absence of urea hydrochloride).

Then 66 g (1.1 mol) of urea was added and stirring was continued. Further, 38.4 g (1.2 mol) of methanol was slowly added dropwise at 65° C. After the addition, stirring was continued for 2 hours at 65° C. It was found that whenever stirring was stopped, the hydrolytic condensate of phenyltrimethoxysilane and the urea hydrochloride resulting from the hydrogen chloride generated were kept separated.

The reaction mixture was then cooled. With 200 g of toluene added, the mixture was allowed to stand for a while whereupon the lower layer, catalyst layer was separated. The upper layer was concentrated at 90° C. under a vacuum of 0.7 kPa and purified by filtration, obtaining 152 g of a polysiloxane product.

The product had a Mw of 750 and a polydispersity index Mw/Mn of 1.44 as measured by GPC. It contained 18.6% of the monomer, phenyltrimethoxysilane. On silicon NMR spectroscopy, the ratio (T2a/T2b) of peak component (T2a) representative of cyclic constituent to peak component (T2b) representative of linear constituent was 0.84.

Japanese Patent Application No. 2009-172006 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An organopolysiloxane mixture comprising cyclic organopolysiloxanes, liner organopolysiloxanes and urea hydrochloride, obtained by hydrolysis and polycondensation of an organosilicon material comprising a first organosilicon compound and/or a partial hydrolytic condensate thereof and optionally, a second organosilicon compound and/or a partial hydrolytic condensate thereof, in the presence of urea hydrochloride said first organosilicon compound having the general formula (1):

$$XSi(OR^1)_3 \qquad (1)$$

wherein X is a $C_1$-$C_{18}$ monovalent hydrocarbon radical which may have at least one functional radical selected from the group consisting of mercapto, epoxy, (meth)acryloxy, alkenyl, amino, and halogen, and $R^1$ is a $C_1$-$C_4$ monovalent hydrocarbon radical, said second organosilicon compound having the general formula (2):

$$Y_rR^2_sSi(OR^1)_{(4-r-s)} \qquad (2)$$

wherein Y is a $C_1$-$C_{18}$ monovalent hydrocarbon radical which may have at least one functional radical selected from the group consisting of mercapto, epoxy, (meth)acryloxy, alkenyl, amino, and halogen, $R^2$ is a $C_1$-$C_3$ monovalent hydrocarbon radical different from Y, $R^1$ is a $C_1$-$C_4$ monovalent hydrocarbon radical, r is 0, 1 or 2, s is 0 or 1, and r+s is 0, 1, 2 or 3, with the proviso that Y is different from X in formula (1) when r is 1 and s is 0, wherein the organopolysiloxane mixture has a polydispersity index (Mw/Mn) of no more than 1.2, given as a weight average molecular weight (Mw) divided by a number average molecular weight (Mn) as measured by gel permeation chromatography versus polystyrene standards, and the organopolysiloxane mixture, when analyzed by silicon nuclear magnetic resonance spectroscopy, exhibits a peak component (T2) assigned to siloxane units formed by hydrolytic condensation between two alkoxy radicals on the first organosilicon compound and/or partial hydrolytic condensate thereof, said peak component (T2) including a peak component (T2a) assigned to the cyclic constituent and a peak component (T2b) assigned to the linear constituent in a ratio (T2a/T2b) of at least 0.9.

2. The organopolysiloxane mixture of claim 1 wherein the ratio (T2a/T2b) is at least 2.0.

3. A method for preparing the organopolysiloxane mixture of claim 1 comprising subjecting an organosilicon material comprising a first organosilicon compound and/or a partial hydrolytic condensate thereof and optionally, a second organosilicon compound and/or a partial hydrolytic condensate thereof to hydrolysis and polycondensation in the presence of urea hydrochloride catalyst which is separable from the resulting organopolysiloxanes, said first organosilicon compound having the general formula (1):

$$XSi(OR^1)_3 \qquad (1)$$

wherein X is a $C_1$-$C_{18}$ monovalent hydrocarbon radical which may have at least one functional radical selected from the group consisting of mercapto, epoxy, (meth)acryloxy, alkenyl, amino, and halogen, and $R^1$ is a $C_1$-$C_4$ monovalent hydrocarbon radical, said second organosilicon compound having the general formula (2):

$$Y_rR^2_sSi(OR^1)_{(4-r-s)} \qquad (2)$$

wherein Y is a $C_1$-$C_{18}$ monovalent hydrocarbon radical which may have at least one functional radical selected from the group consisting of mercapto, epoxy, (meth)acryloxy, alkenyl, amino, and halogen, $R^2$ is a $C_1$-$C_3$ monovalent hydrocarbon radical different from Y, $R^1$ is a $C_1$-$C_4$ monovalent hydrocarbon radical, r is 0, 1 or 2, s is 0 or 1, and r+s is 0, 1, 2 or 3, with the proviso that Y is different from X in formula (1) when r is 1.

4. The method of claim 3 wherein urea hydrochoride the catalyst is urea hydrochloride in alcohol solution.

* * * * *